United States Patent [19]
Hoese

[11] Patent Number: 6,041,381
[45] Date of Patent: Mar. 21, 2000

[54] FIBRE CHANNEL TO SCSI ADDRESSING METHOD AND SYSTEM

[75] Inventor: Geoffrey B. Hoese, Austin, Tex.

[73] Assignee: Crossroads Systems, Inc., Austin, Tex.

[21] Appl. No.: 09/019,448

[22] Filed: Feb. 5, 1998

[51] Int. Cl.⁷ ...................................................... G06F 13/00
[52] U.S. Cl. ................ 710/129; 710/100; 700/5
[58] Field of Search ................. 700/5; 710/100, 710/101, 129; 714/24

[56] References Cited

U.S. PATENT DOCUMENTS

| | | | |
|---|---|---|---|
| 5,634,013 | 5/1997 | Childers et al. | 710/100 |
| 5,748,924 | 5/1998 | Llorens et al. | 710/129 |
| 5,812,754 | 9/1998 | Lui et al. | 714/6 |
| 5,872,945 | 2/1999 | Wett | 710/101 |
| 5,941,472 | 8/1999 | Hoese et al. | 710/129 |

OTHER PUBLICATIONS

Hoese, Geoffrey B., "Fibre Channel to SCSI Addressing," *Crossroads Systems, Inc. Publication*.
Taborek, Rich, "Fibre Channel Standard: Fibre Channel Introduction," *Internet: http://www.amdahl.com/ext/CARP/FCA/FCintro.html*, pp. 1–2, Jan. 31, 1995.

*Primary Examiner*—William Grant
*Assistant Examiner*—Kidest Bahta
*Attorney, Agent, or Firm*—Gray Cary Ware & Freidenrich, LLP

[57] ABSTRACT

A Fibre Channel to SCSI Addressing method and system is provided. The system associates with a Fibre Channel and a SCSI bus. The system further maintains a Fibre Channel to SCSI routing table (90) and a SCSI to Fibre Channel routing table (92). The system receives a cross bus transfer of data that originates on either the Fibre Channel or the SCSI bus, respectively, and wherein the cross bus transfer is intended for a target on the SCSI bus or Fibre Channel, respectively. The apparatus translates addressing information contained in the cross bus transfer by referencing either the Fibre Channel to SCSI routing table 90 or the SCSI to Fibre Channel routing table 92.

13 Claims, 4 Drawing Sheets

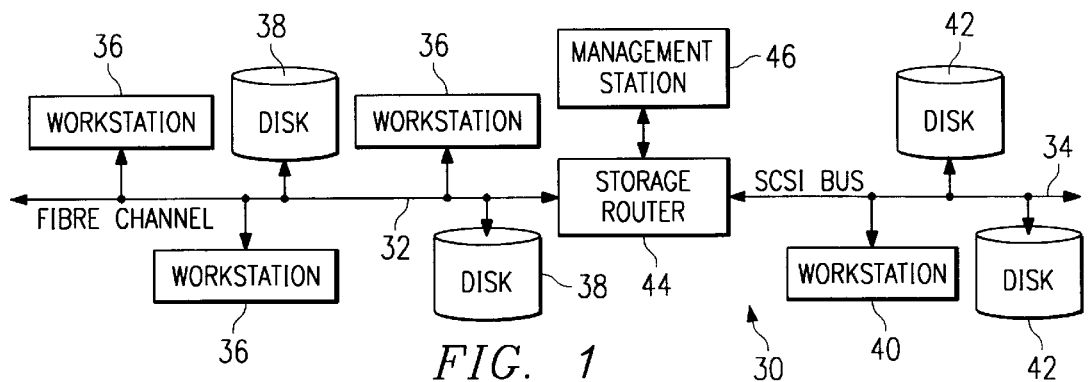
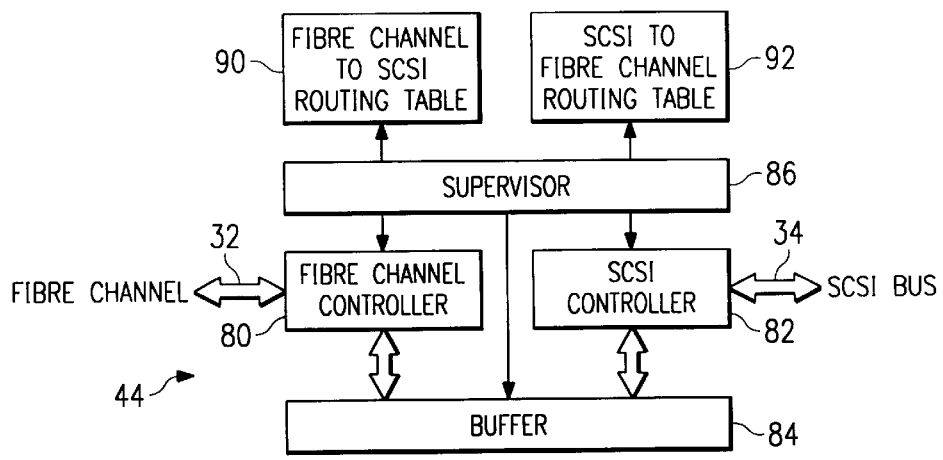

FIG. 4A

| BIT<br>BYTE | 7 | 6 200 | 5 | 4 | 3 | 2 | 1 | 0 |
|---|---|---|---|---|---|---|---|---|
| n | ADDRESS METHOD | | ADDRESS METHOD SPECIFIC | | | | | |
| n+1 | ADDRESS METHOD SPECIFIC | | | | | | | |

| CODES | DESCRIPTION |
|---|---|
| 00 | PERIPHERAL DEVICE ADDRESSING METHOD |
| 01 | VOULUME SET ADDRESSING METHOD |
| 10 | LOGICAL UNIT ADDRESSING METHOD |
| 11 | RESERVED |

FIG. 4C

| BIT<br>BYTE | 7 200 | 6 | 5 | 4 | 3 | 2 | 1 | 0 |
|---|---|---|---|---|---|---|---|---|
| n | 0 | 0 | BUS | | | | | |
| n+1 | TARGET/LUN | | | | | | | |

| BIT<br>BYTE | 7 200 | 6 | 5 | 4 | 3 | 2 | 1 | 0 |
|---|---|---|---|---|---|---|---|---|
| n | 1 | 0 | TARGET | | | | | |
| n+1 | BUS | | | LUN | | | | |

204                              208   212

| FCP LUN VALUE | SCSI BUS:TARGET:LUN |
|---|---|
| 0 | 0:0:0 |
| 1 | 0:1:0 |
| 2 | 0:2:0 |
| 3 | 0:3:0 |
| 4 | 0:4:0 |
| 5 | 0:5:0 |
|  | (0:6:0 OCCUPIED BY INITIATOR ID) |
| 6 | 0:7:0 |
| (...) | (...) |
| 13 | 0:14:0 |
| 14 | 0:15:0 |
| 15 | 1:0:0 |
| 16 | 1:1:0 |
| 17 | 1:2:0 |
| (...) | (...) |

FIG. 5

| SCSI ADDRESS | FC ADDRESS |
|---|---|
| SCSI BUS 0, TARGET 0, LUN 0 | LOOP ID 0, LUN 0x0000 |
| SCSI BUS 0, TARGET 1, LUN 0 | LOOP ID 1 LUN 0x0000 |
| SCSI BUS 0, TARGET 2, LUN 0 | LOOP ID 2 LUN 0x0000 |
| (...) | (...) |
| SCSI BUS 0, TARGET 0, LUN 1 | LOOP ID 16 LUN 0x0000 |
| SCSI BUS 0, TARGET 1, LUN 1 | LOOP ID 17 LUN 0x0000 |
| SCSI BUS 0, TARGET 2, LUN 1 | LOOP ID 18 LUN 0x0000 |
| (...) | (...) |
| SCSI TARGET 7 Unavailable(Bridge Initiator ID) |  |

FIG. 6

FIBRE CHANNEL TO SCSI ADDRESSING METHOD AND SYSTEM

TECHNICAL FIELD OF THE INVENTION

The present invention relates generally to computer network communication and more particularly to a Fibre Channel to SCSI addressing method and system.

BACKGROUND OF THE INVENTION

Typical storage transport mediums provide for a relatively small number of devices to be attached over relatively short distances. One such transport medium is a Small Computer System Interface (SCSI) bus, the structure and operation of which is generally well known. High speed serial interconnects provide enhanced capability to attach a large number of high speed devices to a common storage transport medium over large distances. One such serial interconnect is a Fibre Channel, the structure and operation of which is described, for example, in *Fibre Channel Physical and Signaling Interface (FC-PH)*, ANSI X3T9.3/Project 755D; *Fibre Channel Arbitrated Loop (FC-AL)*, ANSI X3T11/Project 960D; *Fibre Channel Private Loop Direct Attach (FC-PLDA) Technical Report*, Fibre Channel System Initiative; *GigaBaud Link Module (GLM) Family*, Fibre Channel System Initiative, FCSI-301; *Common FC-PH Feature Sets Profiles*, Fibre Channel System Initiative, FCSI-101; *SCSI Profile*, Fibre Channel System Initiative, FCSI-201; and *FCSI IP Profile*, Fibre Channel System Initiative, FCSI-202.

Conventional computing devices, such as computer workstations, generally access storage locally or through network interconnects. Local storage typically consists of a disk drive contained within, or locally connected to, the workstation. Access to the local storage device is through native low level, block protocols that map directly to the mechanisms used by the storage device and consist of data requests with no specific structure and no security controls. Network interconnects typically provide for access between a large number of computing devices and data storage on a remote network server. The remote network server provides file system structure, access control, and other miscellaneous capabilities. Access to the data through the network server is through protocols that map to the file system constructs implemented by the server and involve high level protocols. Consequently, from the perspective of a workstation or other computing device seeking to access such data, the access is much slower than access to data on local storage.

SUMMARY OF THE INVENTION

In accordance with the present invention, a Fibre Channel to SCSI addressing method and system is provided.

According to one aspect of the present invention, the method includes maintaining a table of Fibre Channel Protocol (FCP) bus to SCSI bus routing information. Similarly, a table of SCSI bus to FCP bus routing information is maintained. A cross bus transfer is received which is a message or packet of data that originates from an initiator device that is associated with one bus and must travel to a target device on the other bus. For example, a cross bus transfer may originate at a device on the SCSI bus where the intended target resides on the FCP bus. Similarly a cross bus transfer could comprise a transfer that begins at a device on the FCP bus and is intended for a target that resides on the SCSI bus. The initiating device provides addressing information for the cross bus transfer. The method of the current invention can take this addressing information and translate it by comparing the addressing information to either the table of FCP bus to SCSI bus routing information or the table of SCSI bus to FCP bus routing information depending on which direction the cross bus transfer must travel.

More specifically the method of the current invention can comprise detecting each device associated with the FCP bus and then creating the SCSI bus to FCP bus routing table. Further, the method of the current invention can detect each device associated with the SCSI bus and create the table of FCP bus to SCSI bus routing information.

A technical advantage of the present invention is that a device can now act as a storage router between a SCSI bus and an FCP bus. A storage router implementing the current invention can provide bi-directional access between devices associated with the FCP bus and devices associated with the SCSI bus.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIG. 1 is a block diagram of one embodiment of a network with a storage router that provides global access and routing;

FIG. 2 is a block diagram of a storage, including a Fibre Channel to SCSI addressing system, according to one embodiment of the present invention;

FIGS. 4A, 4B, 4C and 4D are figures defining addressing methods for a storage router according to one embodiment of the present invention;

FIG. 5 is a diagram of one embodiment of a Fibre Channel to SCSI routing table; and FIG. 6 is a diagram of one embodiment of a SCSI to Fibre Channel routing table.

DETAILED DESCRIPTION OF THE INVENTION

Figure 3:
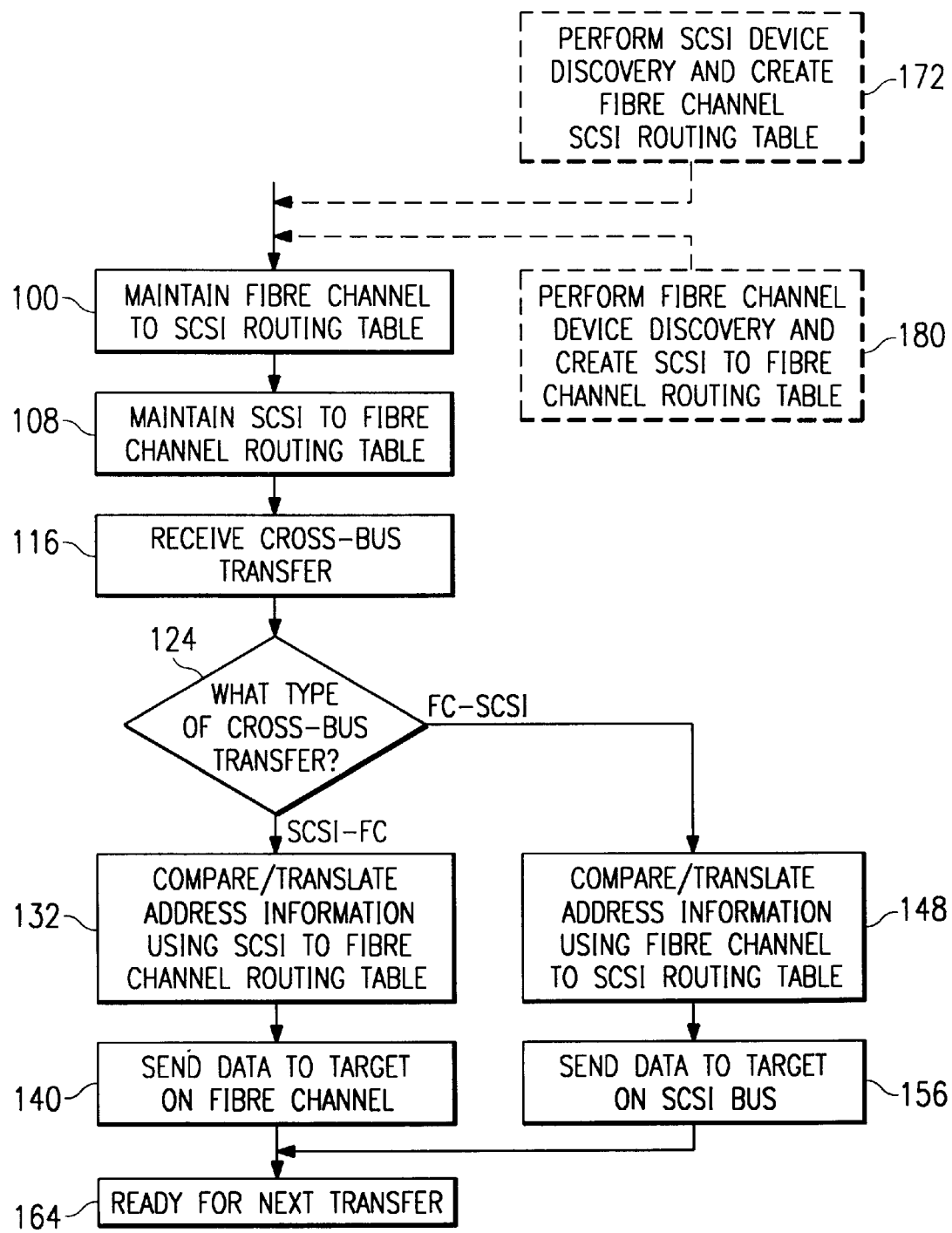
FIG. 3 is a flow chart of a Fibre Channel to SCSI addressing method according to one embodiment of the present invention.

FIG. 1 is a block diagram of one embodiment of a storage network, indicated generally at 30, with a storage router 44 that provides global access and routing. A Fibre Channel high speed serial transport 32 (or a Fibre Channel Protocol (FCP) bus) interconnects a plurality of workstations 36 and storage devices 38. A SCSI bus storage transport medium 34 interconnects workstations 40 and storage devices 42. A storage router 44 serves to interconnect these mediums and provide devices on either medium global, transparent access to devices on the other medium. Storage router 44 routes requests from initiator devices on one medium to target devices on the other medium and routes data from the target to the initiator. Storage router 44 allows initiators and targets to exist on either side. In this manner, storage router 44 enhances the functionality of FCP bus 32 by providing access, for example, to legacy SCSI storage devices 42 on SCSI bus 34. In the embodiment of FIG. 1, the operation of storage router 44 can be managed by a management station 46 connected to the storage router via a direct serial connection. Storage router 44 uses tables, according to the present invention, to map devices from one medium to the other and distribute requests and data between FCP bus 32 and SCSI bus 34. Router 44 can implement such functionality with or without security access controls. Although this extension of the high speed serial interconnect can be beneficial, it is may be desirable to provide security controls in addition to extended access to storage devices through a native low level, block protocol.

FIG. 2 is a block diagram of one embodiment of storage router 44 that includes a Fibre Channel to SCSI addressing system according to one embodiment of the present invention. Storage router 44 can comprise a Fibre Channel controller 80 that interfaces with Fibre Channel 32 and a SCSI controller 82 that interfaces with SCSI bus 34. Buffer 84 provides memory work space and is connected to both Fibre Channel controller 80 and to SCSI controller 82. Supervisor 86 is connected to Fibre Channel controller 80, SCSI controller 82 and buffer 84. Supervisor 86 is also connected to Fibre Channel to SCSI routing table 90 and a SCSI to Fibre Channel routing table 92. Supervisor 86 can comprise a microprocessor for controlling operation of storage router 44 and to handle mapping and security access for requests between Fibre Channel 32 and SCSI bus 34. Supervisor 86 can provide mapping for data transfers between devices on the Fibre Channel 32 and SCSI bus 34 according to the present invention, as described in the following FIGURES and description.

FIG. 3 is a flow chart of a Fibre Channel to SCSI addressing method according to one embodiment of the present invention. At step 100, a storage router maintains a Fibre Channel to SCSI routing table. Next, at step 108, the router maintains a SCSI to Fibre Channel routing table. At step 116, the router receives a cross bus transfer. A cross bus transfer is a transfer of data that must move from one bus to the other. For example, referencing FIG. 1, workstation 36 on Fibre Channel 32 may initiate a transfer of data with disk 42 on SCSI bus 34. Such a transfer is a Fibre Channel to SCSI transfer. Similarly, if work station 40 on SCSI bus 34 initiates a transaction with disk 38 on Fibre Channel 32, such a transaction is a SCSI bus to Fibre Channel transaction. Referencing back to FIG. 3, at step 124, the router determines the type of cross bus transfer. If the transfer is a SCSI bus to Fibre Channel transfer, at step 132 the router compares and translates the address information by using the SCSI to Fibre Channel routing table. Then at step 140, the data is sent on to the target on the Fibre Channel. If the cross bus transfer is a Fibre Channel to SCSI bus transfer, at step 148 the router compares and translates the address information by using the Fibre Channel to SCSI routing table. Then at step 156, the data is sent on to the target on the SCSI bus. At step 164, the next transfer is processed.

In one embodiment of the present invention, an additional initial step is performed. At step 172, the router performs device discovery the SCSI bus and creates the Fibre Channel to SCSI routing table. In an additional embodiment, at step 180, the router performs device discovery the Fibre Channel and then creates the SCSI to Fibre Channel routing table.

The two routing tables are needed because FCP and SCSI systems employ different methods of addressing target devices.

The SCSI bus is capable of establishing bus connections between targets. These targets may internally address up to eight logical units ("LUNs"). The prioritized addressing scheme used by SCSI subsystems can be represented as follows: BUS:TARGET:LUN. The BUS identification is intrinsic in the configuration, as a SCSI initiator is attached to only one bus. Target addressing is handled by bus arbitration from information provided to the arbitrating device. Target addresses are assigned to SCSI devices directly, through some means of configuration, such as a hardware jumper, switch setting, or device specific software configuration. LUN selection is made by using the IDENTIFY message at the target selection. The SCSI protocol provides only logical unit addressing within the IDENTIFY message. Bus and target information is implied by the established connection.

Fibre Channel devices within a fabric are addressed by a unique port identifier. This identifier is assigned to a port during certain well-defined states of the FC protocol. Individual ports are allowed to arbitrate for a known, user defined address. If such an address is not provided, or if arbitration for a particular user address fails, the port is assigned a unique address by the FC protocol. This address is generally not guaranteed to be unique between instances. Various scenarios exist where the arbitrated loop port identifier (AL-PA) of a device will change, either after power cycle or loop reconfiguration.

The FC protocol also provides a logical unit address field within command structures to provide addressing to devices internal to a port. The FCP_CMD payload specifies an eight byte LUN field. Subsequent identification of the exchange between devices is provided by the FQXID (Fully Qualified Exchange ID).

FIG. 4A shows the addressing a scheme used by devices on a Fibre Channel, called the SCC addressing scheme. Address method 200 is the first two bits of the first byte. FIG. 4B shows the definitions for address method 200. FIG. 4C shows the address configuration for data from a device on a Fibre Channel when the device uses peripheral device addressing. Address method 200 is set to 00. The target bus 204 is next. Byte N+1 contains the target/LUN 208/212 information. FIG. 4D shows the address configuration for data from a device on Fibre Channel when the device uses logical unit addressing. Address method 200 is set to 10. Next is the target 208. In the next byte is the bus 204 information as well as the LUN 212 information.

Fibre Channel protocol supports both logical unit addressing and peripheral device addressing. However, not all devices that are operable to attach to a fabric are operable to use both addressing methods. If a device is capable of logical unit addressing, then no translation will be needed. When the device on the Fibre Channel initiates a transaction with a target on the SCSI bus by using logical unit addressing, the initiating device on the Fibre Channel can specify the target on the SCSI bus as well as the LUN on the SCSI bus. However, if the device on the Fibre Channel is only capable of peripheral device addressing, translation will be needed. This is because the target/LUN information is compressed into the second byte of the addressing field.

The present invention handles this translation by using a Fibre Channel to SCSI routing table 90 as shown on FIG. 5. FIG. 5 shows a table whereby each Fibre Channel LUN value is associated with a SCSI bus configuration triplet. Therefore, when a Fibre Channel device using the peripheral device addressing scheme initiates a transaction with a target on the SCSI bus, the LUN value in the addressing information of the transaction can be translated to the appropriate bus/target/LUN value of the device on the SCSI bus.

A further embodiment of the present invention creates this table automatically by first performing a SCSI bus device discovery and then filling in the appropriate values in the Fibre Channel to SCSI routing table. A further embodiment of the present invention can fill in the Fibre Channel to SCSI routing table in order of SCSI bus, target, or LUN.

A technical advantage of such an embodiment is that it allows full discovery by initiators on the Fibre Channel of devices on the SCSI bus behind the storage router.

FIG. 6 is a diagram of one embodiment of SCSI to Fibre Channel routing table. SCSI initiators addressing Fibre Channel targets require that the BUS:TARGET:LUN selected be associated with a given Fibre Channel destination ID and FCP LUN field. When a command is received on the SCSI bus, the routing table is accessed to determine what destination ID, and thus, what FCP target device to which the command is routed. When the FCP_CMD is issued, the LUN field associated with that entry is used, to provide the additional LUN addressing behind the FCP target. Further identification in the later phases of the command processing is by the exchange identifier. In one embodiment of the present invention, the table can be manually edited, for both the Loop ID (AL_PA) and LUN field. Two bytes are provided for the LUN field, so that devices using SCC addressing can be used. In these cases, the bit fields used must be manually configured.

For example, it may be desirable to address a FCP RAID controller using SCC Volume set addressing. In this case, LUN 0 would be addressed by using the LUN value 0×4000. Using logical unit addressing, the LUN value would be 0×8000. Similarly, bus 1, target 2, LUN 3 would be represented as 0×8243.

A number of cases exist where the host operating system or device driver have certain expectations as to what device mapping exists. This typically is due to mappings being used from SCSI bus configurations. Some operating systems map devices into internal tables, which are represented internally as SCSI type BUS:TARGET:LUN triplets. This can cause issues when applications that depend on this structure are used. If a Fibre Channel driver is used that does not use SCC mapping, typically devices are mapped at the Source ID (AL_PA) level to target devices in the internal device map. This causes all devices behind the controller device to appear as LUNs to a single target. This can have the effect of limiting the number of devices that a driver can support, or cause applications to not address certain devices when they expect to be addressing target devices instead of LUN devices. Drivers that support devices with multiple LUNs are particularly at risk. Flexibility in how devices are internally mapped is necessary.

An ideal case can be for host drivers to recognize controller devices from inquiry response data, and respond by using SCC addressing to discovery and map devices internally. In this type environment, the BUS:TARGET:LUN combination can map directly, with a possible offset to the bus number from that used on the storage router.

Although the present invention has been described in detail, it should be understood that various changes, substitutions, and alterations can be made hereto without departing from the spirit and scope of the invention as defined by the appended claims.

What is claimed is:

1. A computer implemented Fibre Channel to SCSI addressing method, comprising:
    maintaining a first table of Fibre Channel to SCSI bus routing information;
    maintaining a second table of SCSI bus to Fibre Channel routing information;
    receiving a cross bus transfer, wherein the cross-bus transfer is initiated by a device on a Fibre Channel or a SCSI bus, respectively, and further wherein the cross bus transfer is intended to be delivered to a target device associated with the SCSI bus or the Fibre Channel, respectively, and further wherein the cross bus transfer contains addressing information that specifies a target for the cross bus transfer; and
    translating the addressing information by comparing the addressing information to either the first table or second table, respectively, such that the cross bus transfer can be delivered to the target.

2. The method of claim 1, further comprising the steps of:
    detecting each device associated with a Fibre Channel; and
    creating the first table of SCSI to Fibre Channel routing information such that each device detected on the Fibre Channel is represented in the first table.

3. The method of claim 1, further comprising the steps of:
    detecting each device associated with a SCSI bus; and
    creating the second table of Fibre Channel to SCSI routing information such that each device detected on the SCSI bus is represented in the second table.

4. The method of claim 1 wherein the first table of Fibre Channel to SCSI routing information comprises data representing at least one FCP LUN value and a SCSI BUS:TARGET:LUN value associated with each FCP LUN value.

5. The method of claim 1 wherein the second table of SCSI to Fibre Channel routing information comprises data representing at least one SCSI BUS:TARGET:LUN value and an FCP LOOP ID:LUN value associated with each SCSI BUS:TARGET:LUN value.

6. A computer implemented Fibre Channel to SCSI addressing method, comprising:
    detecting each device associated with a Fibre Channel;
    creating and maintaining a first table of SCSI to Fibre Channel routing information such that each device detected on the Fibre Channel bus is represented in the first table;
    detecting each device associated with a SCSI bus;
    creating and maintaining a second table of Fibre Channel to SCSI routing information such that each device detected on the SCSI bus is represented in the second table;
    receiving a cross bus transfer, wherein the cross-bus transfer is initiated by a device on a Fibre Channel or a SCSI bus, respectively, and further wherein the cross bus transfer is intended to be delivered to a target device associated with the SCSI bus or the Fibre Channel, respectively, and further wherein the cross bus transfer contains addressing information that specifies a target for the cross bus transfer; and
    translating the addressing information by comparing the addressing information to either the first table or second table, respectively, such that the cross bus transfer can be delivered to the target.

7. The method of claim 6 wherein the first table of Fibre Channel to SCSI routing information comprises data representing at least one FCP LUN value and a SCSI BUS:TARGET:LUN value associated with each FCP LUN value.

8. The method of claim 6 wherein the second table of SCSI to Fibre Channel routing information comprises data representing at least one SCSI BUS:TARGET:LUN value and an FCP LOOP ID:LUN value associated with each SCSI BUS:TARGET:LUN value.

9. A Fibre Channel to SCSI bus addressing system, comprising:
    a computer data storage device;
    a first table of Fibre Channel to SCSI routing information stored on the storage device;
    a second table of SCSI to Fibre Channel routing information stored on the storage device; and
    a supervisor module associated with the computer data storage device, a SCSI Bus, and a Fibre Channel, wherein the supervisor module is operable:

to receive a cross bus transfer, wherein the cross bus transfer is initiated by a device associated with the Fibre Channel or SCSI bus, respectively, and further wherein the cross bus transfer is intended to be delivered to a target device associated with the SCSI bus or Fibre Channel, respectively, and further wherein the cross bus transfer contains addressing information that specifies a target for the cross bus transfer; and to translate the addressing information by comparing the addressing information to either the first table or second table, respectively, such that the cross bus transfer can be delivered to the target.

10. The system of claim 9, wherein the supervisor module is further operable to:

detect each device associated with a Fibre Channel; and create the first table of SCSI to Fibre Channel routing information such that each device detected on the Fibre Channel bus is represented in the first table.

11. The system of claim 9, wherein the supervisor module is further operable to:

detect each device associated with a SCSI bus; and create the second table of Fibre Channel to SCSI routing information such that each device detected on the SCSI bus is represented in the second table.

12. The system of claim 9 wherein the first table of Fibre Channel to SCSI routing information comprises data representing at least one FCP LUN value and a SCSI BUS:TARGET:LUN value associated with each FCP LUN value.

13. The system of claim 9 wherein the second table of SCSI to Fibre Channel routing information comprises data representing at least one SCSI BUS:TARGET:LUN value and an FCP LOOP ID:LUN value associated with each SCSI BUS:TARGET:LUN value.

* * * * *